(12) United States Patent
Dillinger

(10) Patent No.: US 10,216,611 B2
(45) Date of Patent: Feb. 26, 2019

(54) DETECTING MISTYPED IDENTIFIERS AND SUGGESTING CORRECTIONS USING OTHER PROGRAM IDENTIFIERS

(71) Applicant: Synopsys, Inc., Mountain View, CA (US)

(72) Inventor: Peter Dillinger, Seattle, WA (US)

(73) Assignee: Synopsys, Inc., Mountain View, CA (US)

( * ) Notice: Subject to any disclaimer, the term of this patent is extended or adjusted under 35 U.S.C. 154(b) by 61 days.

(21) Appl. No.: 15/593,292

(22) Filed: May 11, 2017

(65) Prior Publication Data

US 2017/0329697 A1 Nov. 16, 2017

Related U.S. Application Data

(60) Provisional application No. 62/334,981, filed on May 11, 2016.

(51) Int. Cl.
*G06F 9/44* (2018.01)
*G06F 11/36* (2006.01)
*G06F 8/75* (2018.01)

(52) U.S. Cl.
CPC ............ *G06F 11/3624* (2013.01); *G06F 8/75* (2013.01); *G06F 11/3644* (2013.01)

(58) Field of Classification Search
None
See application file for complete search history.

(56) References Cited

U.S. PATENT DOCUMENTS

| | | | | |
|---|---|---|---|---|
| 8,918,772 | B1* | 12/2014 | MacLachlan | G06F 11/3604 717/141 |
| 2004/0111708 | A1* | 6/2004 | Calder | G06F 11/3447 717/131 |
| 2005/0108682 | A1* | 5/2005 | Piehler | G06F 8/33 717/110 |
| 2011/0321007 | A1* | 12/2011 | Marum | G06F 8/65 717/113 |
| 2012/0167060 | A1* | 6/2012 | Landwehr | G06F 11/3604 717/132 |
| 2012/0311535 | A1* | 12/2012 | Fanning | G06F 11/3604 717/123 |
| 2013/0007700 | A1* | 1/2013 | Villar | G06F 8/33 717/109 |

(Continued)

*Primary Examiner* — Insun Kang
(74) *Attorney, Agent, or Firm* — Fenwick & West LLP

(57) ABSTRACT

A code testing system determines mistyped identifiers in computer language code. For identifiers of objects in the code, such as variables and functions, the instances of the identifiers are identified in the code and recorded in an occurrence table. Uses of an identifier may be identified as copies of one another based on a hash value of the instance and its location in a function. Hash values for an identifier that are not unique may not be recorded in the instance table. For identifiers that are associated with a single occurrence or a single group of copies, these identifiers are identified as candidates for correction. Suggested corrections are determined based on a comparison with other identifiers in the occurrence table to determine similar identifiers in the occurrence table. If so, the candidate identifier may be identified as likely mistyped and the similar identifier is suggested as a correction.

20 Claims, 3 Drawing Sheets

(56) References Cited

U.S. PATENT DOCUMENTS

| | | | |
|---|---|---|---|
| 2013/0055221 A1* | 2/2013 | Murthy | G06F 11/3608 717/132 |
| 2013/0179863 A1* | 7/2013 | Vangala | G06F 8/74 717/124 |
| 2014/0109042 A1* | 4/2014 | Christensen | G06F 8/34 717/109 |
| 2014/0351793 A1* | 11/2014 | Bartley | G06F 11/3676 717/124 |
| 2015/0135166 A1* | 5/2015 | Tarlow | G06F 8/34 717/125 |

* cited by examiner

DETECTING MISTYPED IDENTIFIERS AND SUGGESTING CORRECTIONS USING OTHER PROGRAM IDENTIFIERS

CROSS REFERENCE TO RELATED APPLICATIONS

This application claims the benefit of provisional application No. 62/334,981, filed May 11, 2016, the entirety of which is hereby incorporated by reference.

BACKGROUND

This invention relates generally to identifying software errors, and particularly to detecting errors when an identifier has been mistyped.

Software source code relies on names, called identifiers, to distinguish program entities such as data objects, data members, sub-entities, functions, or subroutines. A common mistake is to misspell or to mistype an identifier, causing a failure to refer to the intended program entity. A feature of many programming languages and environments called static resolution detects these mistakes at the cost of imposing a discipline on the programmer. Static resolution, for example, may require a variable to be defined prior to its use. However, it is common to opt out of static resolution or to use a programming language with limited or no support for it, which may be the design of the programming language. In these cases, a mistyped or misspelled identifier can survive initial development and testing to become a software defect that is costly in its impact and costly to fix.

Algorithms for deriving facts and heuristic inferences about computer programs without actually running those programs are called static analyses. For example, static analysis techniques exist for determining which function definitions might be called from a specific function call site; this is often known as a callgraph analysis. Commercial static analysis tools are software packages that run static analyses on other software, and commonly report results in the form of defects discovered in the analyzed software.

Commercial static analysis tools are software packages that run static analyses on other software, and commonly report results in the form of defects discovered in the analyzed software.

SUMMARY

A code testing system performs static analysis for detecting many cases of misspelled or mistyped identifiers that uses other identifiers in the program as a reference for determining a mistyped identifier. This analysis is most applicable when static resolution is not used, such as in dynamic programming languages, and may be integrated into a commercial static analysis tool.

This static analysis consists of two major phases. The first phase gathers and indexes information about identifiers in the program, and the second phase infers defects from the indexed information.

The first phase iterates over occurrences of identifiers in a set of identified functions in the program and records data about each occurrence of an identifier in an occurrence table. The occurrence table designates, for each identifier, locations in the code at which the identifier occurs to identify instances of the identifier. These instances represent the number of times in the code that the identifier is used. In this way, the occurrence table is a map from identifier strings to lists of source code locations, and this table enables looking up the number and location of all occurrences of any given identifier string. In some configurations, a "copy" of the same use of an identifier is not treated as a distinct occurrence of the identifier. To determine whether a given use of the identifier has been added by a typist (and thus is another distinct occurrence of the identifier that could be correctly typed) or is a copy of a prior use, a hash value may be determined for the identifier based on the location of the identifier in a function using the identifier. The location may be based on traversal of an abstract syntax tree of the function. When the hash value is the same for a use of the identifier compared to a hash value already existing in the occurrence table, that use (in this configuration) is not designated as another distinct occurrence of the identifier. Thus, in this configuration, the algorithm counts how many uses of the identifier are considered distinct ("occurrences") rather than the raw number of uses of the identifier in the code.

The second phase uses the occurrence table to identify identifiers that are likely mistakes, and suggest a correction for the identifier. To identify those identifiers that may be errors, the identifiers are analyzed to determine frequency of occurrence and similarity to other identifiers. The identifiers that are candidates for identification as errors may be identified using a set of rules. As one example rule, identifiers that occur less frequently than a threshold frequency, such as once (uniquely), twice or three times in the code, may be identified as candidates. Those identifiers that occur above the threshold frequency may be considered proper identifiers and as likely correctly typed by the programmer. For identifiers that do not occur above this frequency, other rules or filters may designate that the identifier does not qualify for consideration, for example because the identifier is too short or has other indicia that it may be properly typed.

After applying the set of rules to determine the candidate identifiers, suggestions are identified for correcting the candidate identifiers in the code. To determine the suggestions, variations of the identifier may be compared to existing identifiers in the occurrence table to determine whether the variations are present in the code. In some examples, rather than determining variations and then checking the variations against the occurrence table, the identifiers are compared directly with the identifiers in the occurrence table, to determine a similarity between the candidate identifier and other identifiers in the occurrence table. Those identifiers in the occurrence table that are similar to the candidate identifier are identified as similar identifiers and may be suggested as a correction to the candidate identifier. The similar identifiers may be filtered and/or scored based on the type of modification, relative position, and other rules to exclude false positives and similar-but-intentional differences between identifiers.

Some advantages of using this static analysis to detect mistyped identifiers are that (a) it does not depend on running the program, (b) it does not depend on a predefined dictionary or a coding standard for reference which can simplify configuration and make it agnostic to the natural language(s) used in constructing identifiers, and (c) does not depend on analyzing a semantic model of the program, and may only use syntactic analysis. By determining the hash value for uses of an identifier, this analysis may also account for duplicate or near duplicate copies of the code analyzed at a given time, for example because of copying or other repetition of the use provided for simultaneous analysis that do not actually represent separately entered uses of the identifier by a programmer.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
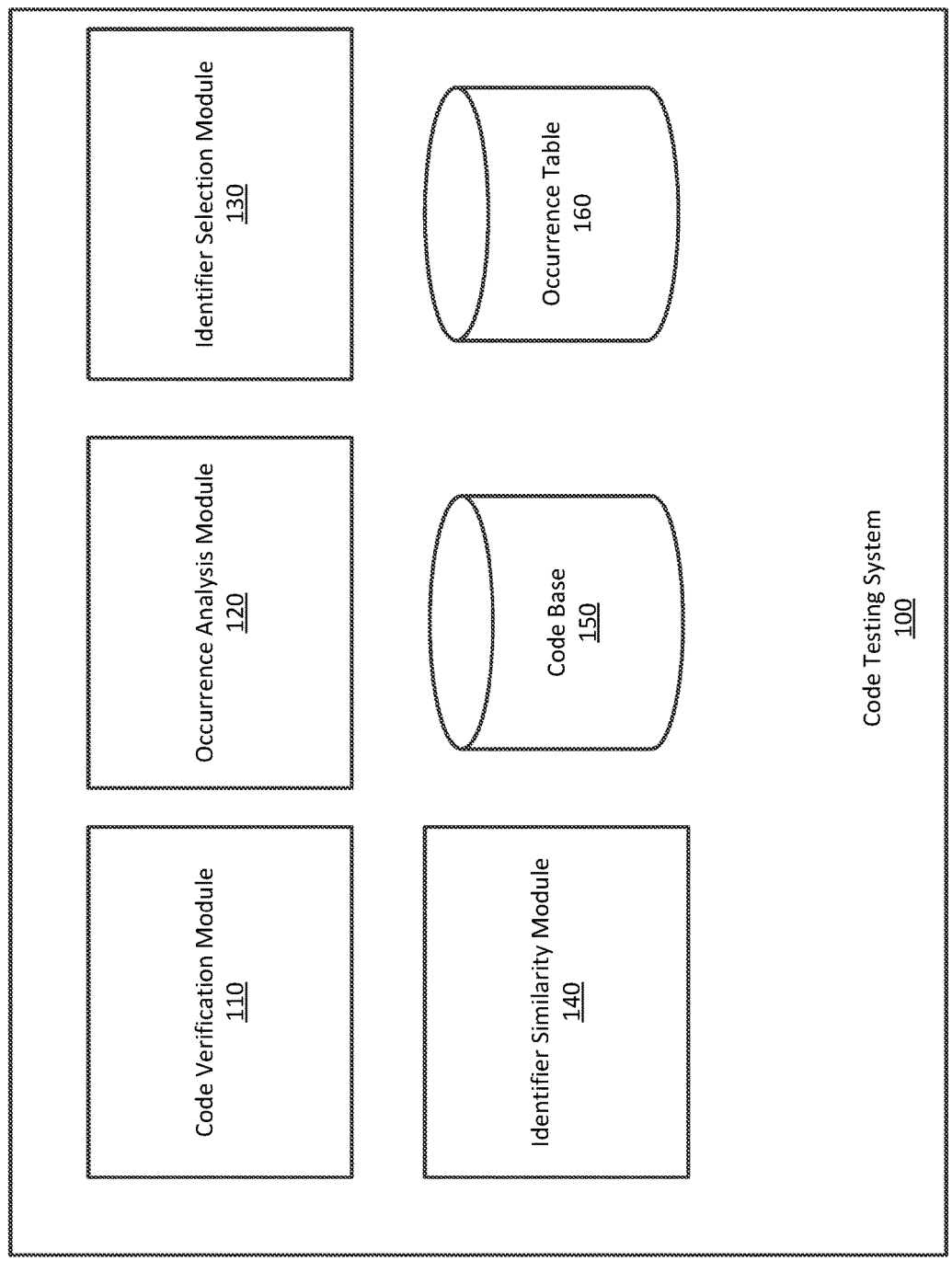
FIG. 1 shows an example code testing system for analyzing errors in computer code.

FIG. 1 shows an example code testing system 100 for analyzing errors in computer code. The code testing system 100 applies code testing to a code base 150 to determine errors in the code base 150, and may include static analysis of the computer code. Static analysis includes methods and algorithms for deriving facts and heuristic inferences about computer programs without actually running those programs. The code testing system 100 uses static analysis to determine whether the code base 150 includes mistyped identifiers.

The code testing system 100 includes a code verification module 110, an occurrence analysis module 120, an identifier selection module 130 and an identifier similarity module 140 to determine whether identifiers in computer code has been mistyped. Because in some programming languages identifiers are not checked against prior occurrences of the identifier or against identifier types or classes, this may be proper syntax and even execute correctly in many circumstances, so that an error may not be easily detected by normal compilation or interpretation of the code itself.

The code verification module 110 may receive a request from a user to test a portion of code in the code base 150. The code base 150 may include portions of code in a programming language for testing and analysis by the code testing system. The user may specify to the code verification module 110 a specific portion of code or other portion of a program to test. The code verification module 110 analyzes the code base 150 in conjunction with other components of the code testing system 100 to provide likely errors in the code to the user. These errors may be identified based on the code base 150 itself without requiring the dynamic execution of the program. Although the code testing system 100 may also include further various dynamic and operational testing of the program. The operations described herein to identify errors may be included in a suite of tests performed by the code testing system 100 and orchestrated by the code verification module 110.

After designation of portions of the code base 150, the code verification module 110 identifies a set of functions for the requested test. To identify what identifiers may be used these identified functions, the code verification module 110 passes the set of functions and its associated code in the code base 150 to the occurrence analysis module 120. In some instances, the same function may be designated for analysis to the code verification module 110 at the same time in several forms. For example, it may be common for some code, such as JavaScript, to be copied, aggregated, reformatted, and otherwise manipulated in its integration and deployment. As one example, the code may also be modified, for example, through "minification" to strip whitespace, comments, and may also rename variables. Thus, the code verification module 110 may receive both the original source code and such modified code for analysis together.

The occurrence analysis module 120 generates an occurrence table 160. The occurrence table 160 identifies the location of each identifier in the selected code of the code base 150. The occurrence table 160 may also follow function calls from the selected functions to identify the occurrence of identifiers within called functions. The occurrence table 160 can be implemented as a hash table mapping strings to vectors of location records, where a location record may consist of a filesystem path string, which designates a source file, and an integer, which designates a line number within that file. The occurrence analysis module 120 identifies each identifier occurrence in the program and it looks up the identifier string in the occurrence table 160. When the identifier is not in the occurrence table 160, a new record is added. Then, the occurrence analysis module 120 appends the source code location for that occurrence to the record.

In another configuration, the occurrence table is generated using hash values to identify occurrences of the identifier. The hash value may be determined based on the identifier name, the function containing the identifier, and the position of the identifier in the function. The hash value may be used to identify when the use of an identifier is actually the same across multiple functions or code segments provided for analysis. For example, since original code and minimized code (e.g., through minification) may both be provided for analysis, a single misspelled identifier may appear multiple times in the analyzed code. The hash value thus may disambiguate these uses (and identify when a second use is effectively a copied use of the first use). In one example, the hash value may be determined by applying a hash function to a combination of the identifier text, the function in which the identifier is used, and a location of the identifier in the function. The hash function may generate a hash value having a constant length, such as 32, 64, or 128 bits.

To standardize the location of the identifier in the function across different copies of a function, the functions may be converted to an abstract syntax tree. The abstract syntax tree represents the function with respect to the operations and identifiers of the function as nodes of the tree. The abstract syntax tree thus may standardize the logical representation of the functions. Though an abstract syntax tree is used as an example tree herein, other tree or logical representations of a function may be used to standardize formatting of a function code with respect to its logical operation.

The position of an identifier may then be determined based on the identifier's location with respect to traversal of the tree. For example, the tree may be traversed in a depth-first post-order traversal, although other traversals may also be used. By specifying the location with respect to the abstract syntax tree, the location may be consistent across variations of the code that may represent copies of an original mistyping. Using the traversal, the location of an identifier may be determined by the number of nodes traversed until reaching the node of the identifier.

In this configuration, for each function for analysis, the function may be converted to an abstract syntax tree, and the tree is traversed to identify the location of the identifiers in the tree and a corresponding hash value. For each identifier, the occurrence table is updated by identifying whether the hash value exists in the occurrence table. When the hash value does not exist in the occurrence table, a new instance of the identifier is added to the instance tree by adding the hash value to the occurrence table, which may also specify the location and function of the hash value. When the hash value is already in the occurrence table, no new instance (or occurrence) of the identifier is identified and the use in the corresponding function is likely a copy of another use of the identifier, which has the same hash value. When the hash value is in the occurrence table, the number of occurrences is thus not incremented, although the additional function and location in which the instance occurred may be recorded. The occurrence table for may organize the stored hash values as a hash table or a tree for a given identifier. To determine the number of instances of an identifier, the occurrence analysis module 120 may count the number of unique hash values in the occurrence table.

Using the occurrence analysis, the code verification module 110 provides the occurrence table 160 to the identifier selection module 130, which determines which identifiers may be mistyped and should be further analyzed based on the number of instances of the identifiers. The identifier selection module 130 analyzes the occurrence table 160 to identify identifiers that are likely mistyped. Those identifiers which are likely mistyped may then be provided to the identifier similarity module 140 to determine whether other identifiers are similar and whether another identifier may be identified as a correction.

The identifiers that may be mistyped are termed candidate identifiers and are identified (i.e., filtered) from the identifiers in the occurrence table based on a set of rules. The set of rules may include those identifiers that occur a limited number of times in the occurrence table, e.g., less than a threshold frequency. The threshold frequency may be one, two, three, or another suitable frequency for the identifiers. The threshold may be configurable by the user of the code testing system 100 to adjust the sensitivity of detecting likely mistyped identifiers. For example, the threshold may be set to one for high selectivity, such that only uniquely-used identifiers (which may be with respect to a hash value) are candidates as misspelled. Higher thresholds may identify additional candidates for suggested correction (e.g., frequent mistyping of the same identifier) but also be more likely to identify false positives. The initial set of candidate identifiers may be identified with an iteration over the occurrence table to identify the count of instances of each identifier and identifiers having a count within the threshold frequency. After initially identifying these identifiers using the threshold frequency, rules may additionally exclude some identifiers from the candidate identifiers. These additional exclusions may include identifiers, for example, that meet a coding standard or convention. For example, some known problematic names or terms, including from a dictionary or common programming library, may be excluded. As another option, the candidate identifiers may exclude identifiers below a threshold length.

The identifier similarity module 140 determines, from the occurrence table, similar identifiers for each candidate identifier. When there are similar identifiers, the candidate identifier may be identified as an error, and similar identifiers may be suggested as a correction.

Each occurrence of candidate identifiers may be separately analyzed for an individual recommendation at the location of the occurrence, or all occurrences of the candidate identifiers may have the same suggestion. For example, the same mistyped identifier may occur at different portions of the code, which may be near different similar identifiers.

For each candidate identifier that may be possibly mistyped, various edits of that identifier string are considered and queried against identifiers in the occurrence table to determine matches between the candidate identifiers and other identifiers in the code. These various edits may include different typographical differences that a typist may perform or may be difficult to discern to the eye. For example, such various edits may include:

removing or adding characters ("FirstItem" to "FirtItem")

transposing (swapping) adjacent characters ("FirstItem" to "FirstIetm")

changing between uppercase and lowercase ('A' to 'a' or 'a' to 'A')

modifying style for compound identifiers, such as capitalization or underscores between terms:

addOneElement add_one_element addoneelement replacing typographically similar characters ('O' to '0' or 'rn' to 'm')

This enables detection of cases of an identifier occurring only once (or below another threshold frequency) in the program that are close in spelling and/or typography to another identifier occurring in the program; such a situation suggests one is mistyped and the identifier may be reported as an error.

In another example, rather than querying specific modifications to an identifier, the candidate identifier may be compared against identifiers in the occurrence table to determine a similarity between the candidate identifiers and other identifiers. For example, the number of characters that match the candidate identifier and order thereof may be identified to determine a similarity score between the candidate identifier and other identifiers. Identifiers with a sufficient similarity score (e.g., above a similarity threshold) may be included as similar identifiers. Alternatively, a similarity score may be used in ranking identified similar identifiers rather than, or in addition to, determining which identifiers to include.

In addition to modifying the candidate identifiers to determine similar identifiers, various filters and other rules may be used to exclude possible false positives or adjust the scoring of a identifier as candidate as a correction. Such filters and rules may be based on identifier length, scope, position, type of typographical difference and other as discussed below. As one example, other filters can reduce false positive defect reports, such as excluding similar identifiers shorter than a minimum length for consideration, or excluding similar identifiers that are known to be relevant only to a small part of the program, for example if an identifier is scoped to a function having limited size or number of identifiers.

The number of occurrences (or instances) of the similar identifier may also be used to filter or select identifiers for the set of similar identifiers. For example, identifiers that are candidate identifiers may be excluded. As further examples, a similar identifier may be included when it occurs in the occurrence table more often than the candidate identifier. The number of occurrences for an identifier to be included as a similar identifier may vary based on the typographical difference (i.e., the type of difference). For example, the addition or deletion of most characters may only require that the similar identifier occur at least once more than the candidate identifier but the addition or deletion of other characters, more likely to be intentional, may require additional occurrences of the similar identifier to include the similar identifier. Completing this example, an addition of the letter 'e' may require one additional occurrence, while the addition of an underscore (_) or a hyphen (-) may be more likely to be intentional and require additional occurrences for inclusion as a similar identifier used for suggesting candidates to correct a candidate identifier.

Thus, one component of this process is generation of plausible edits from one identifier to a potentially corrected version of that identifier. In one example, the number of possible edits to a candidate identifier is kept small (i.e., by considering a small number of specific modifications to a candidate identifier) to improve scalability of the static analysis.

In another example, suggested identifiers (for correction of the candidate identifier) from the occurrence table should be conceptually close, so that they are more likely to derive from unintentional rather than intentional differences. For example, typographical differences that removes a single character is tractable and rarely alters the identifier enough to make it more likely intended as a distinct identifier. However, adding, removing, or changing numeral characters is most often intended as a true distinction. Such typographical differences may be excluded or filtered from the similar identifiers to reduce false positive defect reports. In one configuration, a set of intentional modifications is identified and used to exclude candidate identifiers that are likely intentional. The intentional modifications may be determined by comparing candidate identifiers with an identified similar identifier and determining if the difference meets one of the rules of the set intentional modifications. As one example intentional modification, the rules may filter similar candidates that differ by a number only (e.g., '1' to '2').

From the candidate identifiers, the identifier similarity module 140 identifies one or more corrections from the set of similar identifiers to suggest to a user, which may be reported as an error or warning about the code. In addition, the source locations in the occurrence table of the candidate and similar identifiers may be used to filter or score the likelihood that the candidate is a mistyped version of the similar identifier. For example when the source locations are similar for the candidate identifier and the similar identifier, the typist more likely intended the same identifier. When the locations are more than a threshold number of lines away from one another, the other similar identifier may be excluded as a suggested correction. When candidate identifier has a location within the threshold number of lines, the similar identifier may be maintained for consideration as a suggested correction. As an alternative to a number of lines, the locations may be compared based on the relative positions in an abstract syntax tree or other logical representation of a function or the code.

In some cases, more than one similar identifier may be identified. The similar identifiers may scored, and ordered to determine a set of suggested corrections for the candidate identifier. The various methods for filtering similar identifiers discussed above (e.g., candidate identifier position) may alternatively, or in conjunction, be used for scoring or ordering of the similar identifiers as suggested corrections to the candidate identifier. The ordering may thus be based on the number of characters in common between the similar identifier and the candidate identifier, or based on the type of modification of the candidate identifier and the similar identifier. For example, a type of modification that removes a character may be ordered as a more likely correction than a modification that changes a number in the candidate identifier.

Figure 2:
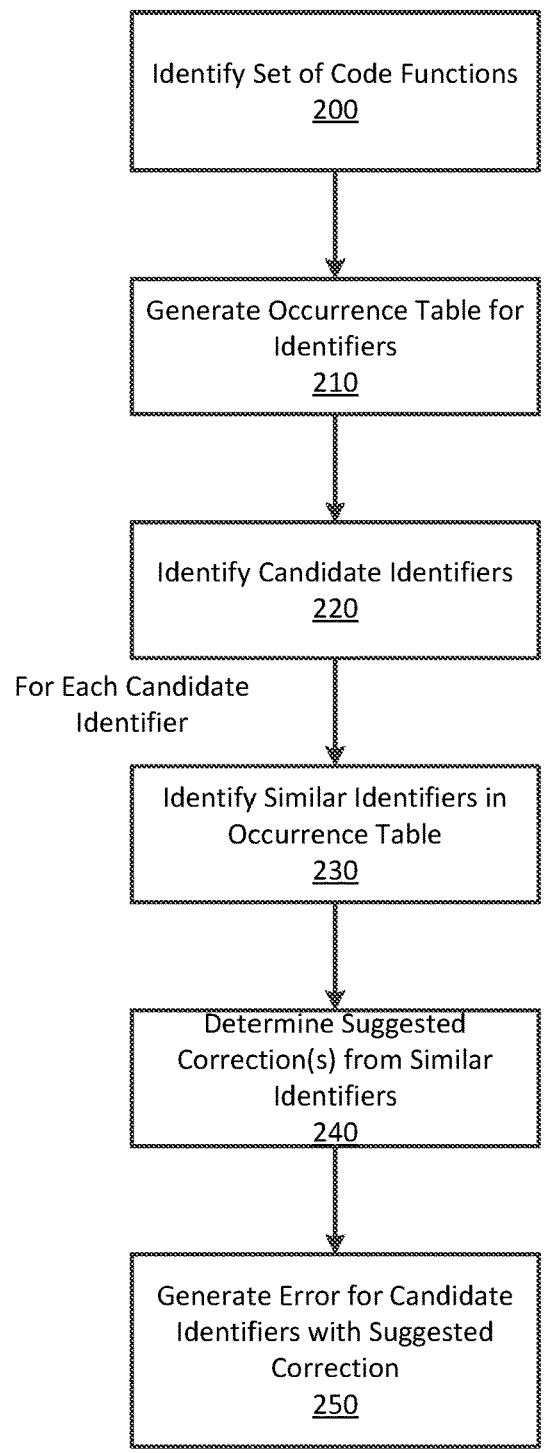
FIG. 2 shows a sample method for detecting code errors.

FIG. 2 shows a sample method for detecting code errors according to one embodiment. This method may be performed, for example, by the modules of the code testing system 100. Initially, a set of code functions are identified 200 for analyzing mistyped identifiers. Next, the code identifiers are indexed 210 in an occurrence table to identify the number of instances or occurrences of each identifier. To address the possibility of duplicated or copied code, each use of an identifier may be characterized by a hash value as described above. As discussed, a use of an identifier may be included in the occurrence table as a new occurrence (and thereby increase the number of times the identifier is used) only when the hash value for the use is not previously in the table for the identifier. The process next identifies candidate identifiers that may have been mistyped using the number of occurrences of the identifiers in the occurrence table as noted above.

Next, for each of the identified candidate identifiers, a set of similar identifiers are identified 230 from similar identifiers in the occurrence table. The set of similar identifiers may include identifiers that are similar to the candidate identifier as noted above. The set of similar identifiers may also be filtered to exclude likely false positives, for example based on the type of typographical difference, relative position of the candidate identifier to the similar identifier, the frequency of the similar identifier. From the set of similar identifiers, a suggested correction is determined 240. The suggested correction(s) may be based on a scoring of the similar identifiers, which may be adjusted based on various factors as discussed above. When there is a suggested correction for a candidate identifier, an error may be generated 250 to identify the candidate identifier and provide the suggested identifier as a correction.

Figure 3:
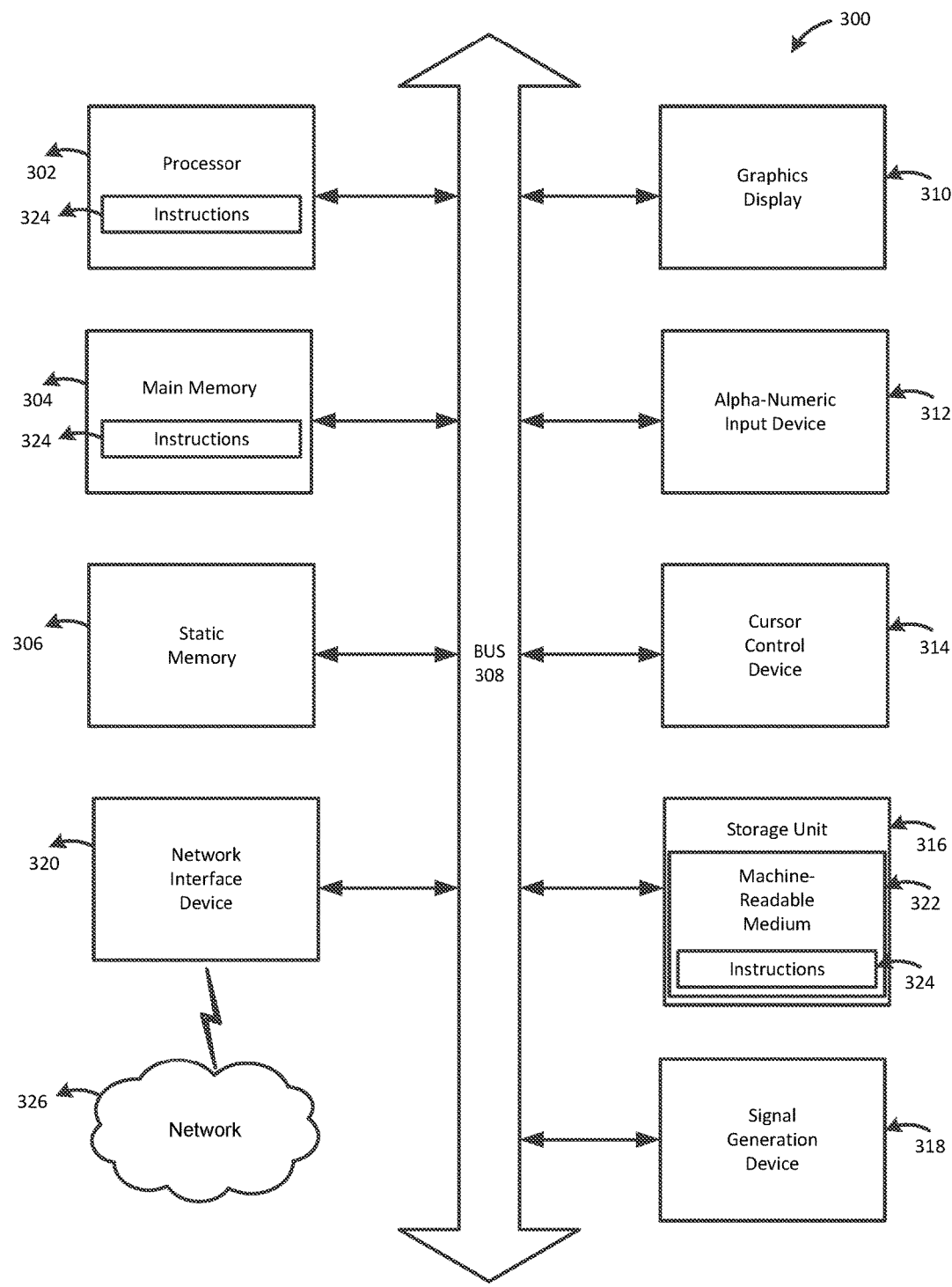
FIG. 3 illustrates components of an example machine that reads instructions from a machine-readable medium and execute them in a processor (or controller), according to one embodiment.

FIG. 3 is a block diagram illustrating components of an example machine able to read instructions from a machine-readable medium and execute them in a processor (or controller). The code testing system 100 may be implemented in an example machine as shown in FIG. 3, and such an example machine may also describe an example machine on which the code included in code base 150 may be executed. Specifically, FIG. 3 shows a diagrammatic representation of a machine in the example form of a computer system 300 within which instructions 324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)). The computer system 300 may also include alphanumeric input device 312 (e.g., a keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for suggesting corrections to in computer code prior to execution by a computer comprising:
   identifying, by a computer system, a set of functions in computer code in a programming language, the programming language of the computer code permitting usage of identifiers without static resolution;
   generating, by the computer system, an occurrence table of each identifier in the computer code, the occurrence table identifying instances of each identifier in the computer code;
   identifying, by the computer system, a set of candidate identifiers from the identifiers in the occurrence table that have fewer instances in the occurrence table than a threshold, wherein each candidate identifier in the set of candidate identifiers is a possible mistyped identifier;
   for each candidate identifier in the set of candidate identifiers, identifying, by the computer system, a set of similar identifiers in the occurrence table;
   identifying, by the computer system, a correction for the candidate identifiers in the set of candidate identifiers based on the set of similar identifiers;
   suggesting, on a user interface to a user, the correction for the candidate identifier in the set of candidate identifiers to modify the computer code; and
   providing a control for applying the correction to modify the candidate identifiers in the computer code in response to a user command.

2. The method of claim 1, wherein generating an occurrence table for each identifier includes determining, for each use of each identifier in the computer code, a function containing each identifier, and a position of each identifier in the function.

3. The method of claim 2, wherein determining the position of each identifier in the function is based on an abstract syntax tree of the function containing each identifier.

4. The method of claim 3, wherein determining the position of each identifier in the function is based on a depth-first post-order traversal of the abstract syntax tree.

5. The method of claim 2, wherein generating the occurrence table comprises: determining, by the computer system, for each use of each identifier in the computer code, a hash value based on each identifier and a position of each identifier in a function; and identifying, by the computer system, instances of each identifier for each unique hash value of each identifier.

6. The method of claim 1, wherein the correction for at least one candidate identifier of the set of candidate identifiers is identified in the set of similar identifiers and occurs in the occurrence table more than the at least one candidate identifier.

7. The method of claim 6, wherein the correction for the at least one candidate identifier is identified based on a threshold number of instances of the similar identifiers, the threshold number varying based on a type of typographical difference between the at least one candidate identifier and the similar identifiers.

8. A non-transitory computer-readable medium for suggesting candidate correction to computer code prior to execution by a computer, the computer-readable medium comprising instructions executable by a processor to perform:
identifying a set of functions in computer code in a programming language, the programming language of the computer code permitting usage of identifiers without static resolution;
generating an occurrence table of each identifier in the computer code, the occurrence table identifying instances of each identifier in the computer code;
identifying a set of candidate identifiers from the identifiers in the occurrence table that have fewer instances in the occurrence table than a threshold, wherein each candidate identifier in the set of candidate identifiers is a possible mistyped identifier; for each candidate identifier in the set of candidate identifiers, identifying a set of similar identifiers in the occurrence table;
identifying a correction for the candidate identifiers in the set of candidate identifiers based on the set of similar identifiers;
suggesting, on a user interface to a user, the correction for the candidate identifier in the set of candidate identifiers to modify the computer code; and
providing a control for applying the correction to modify the candidate identifiers in the computer code in response to a user command.

9. The computer-readable medium of claim 8, wherein generating an occurrence table for each identifier includes determining, for each use of each identifier in the computer code, a function containing each identifier, and a position of each identifier in the function.

10. The computer-readable medium of claim 8, wherein determining the position of each identifier in the function is based on an abstract syntax tree of the function containing each identifier.

11. The computer-readable medium of claim 10, wherein determining the position of each identifier in the function is based on a depth-first post-order traversal of the abstract syntax tree.

12. The computer-readable medium of claim 9, wherein generating the occurrence table comprises: determining, for each use of each identifier in the computer code, a hash value based on each identifier and a position of each identifier in a function; and identifying instances of each identifier for each unique hash value of each identifier.

13. The computer-readable medium of claim 8, wherein the correction for at least one candidate identifier of the set of candidate identifiers is identified in the set of similar identifiers and occurs in the occurrence table more than the at least one candidate identifier.

14. The computer-readable medium of claim 13, wherein the correction for the at least one candidate identifier is identified based on a threshold number of instances of the similar identifiers, the threshold number varying based on a type of typographical difference between the at least one candidate identifier and the similar identifiers.

15. A system for detecting errors in computer code prior to execution by a computer comprising:
a processor; and
a non-transitory computer-readable medium comprising instructions executable by a processor to perform:
identifying a set of functions in computer code in a programming language, the programming language of the computer code permitting usage of identifiers without static resolution;
generating an occurrence table of each identifier in the computer code, the occurrence table identifying instances of each identifier in the computer code;
identifying a set of candidate identifiers from the identifiers in the occurrence table that have fewer instances in the occurrence table than a threshold, wherein each candidate identifier in the set of candidate identifiers is a possible mistyped identifier;
for each candidate identifier in the set of candidate identifiers, identifying a set of similar identifiers in the occurrence table;
identifying a correction for the candidate identifiers in the set of candidate identifiers based on the set of similar identifiers;
suggesting, on a user interface to a user, the correction for the candidate identifier in the set of candidate identifiers to modify the computer code; and
providing a control for applying the correction to modify the candidate identifiers in the computer code in response to a user command.

16. The system of claim 15, wherein generating an occurrence table for each identifier includes determining, for each use of each identifier in the computer code, a function containing each identifier, and a position of each identifier in the function.

17. The system of claim 16, wherein determining the position of each identifier in the function is based on an abstract syntax tree of the function containing each identifier.

18. The system of claim 17, wherein determining the position of each identifier in the function is based on a depth-first post-order traversal of the abstract syntax tree.

19. The system of claim 18, wherein generating the occurrence table comprises: determining, for each use of each identifier in the computer code, a hash value based on each identifier and a position of each identifier in a function; and identifying instances of each identifier for each unique hash value of each identifier.

20. The system of claim 18, wherein the correction for at least one candidate identifier of the set of candidate identifiers is identified in the set of similar identifiers and occurs in the occurrence table more than the at least one candidate identifier.

* * * * *